US006654756B1

(12) United States Patent
Quernemoen et al.

(10) Patent No.: US 6,654,756 B1
(45) Date of Patent: Nov. 25, 2003

(54) COMBINATION OF MASS STORAGE SIZER, COMPARATOR, OLTP USER DEFINED WORKLOAD SIZER, AND DESIGN

(75) Inventors: John M. Quernemoen, New Brighton, MN (US); Mark G. Hazzard, Forest Lake, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/514,801

(22) Filed: Feb. 29, 2000

(51) Int. Cl.[7] .............................................. G06F 17/30
(52) U.S. Cl. ......................... 707/100; 707/1; 707/205; 702/186
(58) Field of Search ............................. 707/1, 10, 100, 707/205; 705/10; 709/201; 702/186

(56) References Cited

U.S. PATENT DOCUMENTS

| 4,484,270 A | * | 11/1984 | Quernemoen et al. ........ 710/37 |
| 4,747,041 A | * | 5/1988 | Engel et al. .................. 307/29 |
| 5,065,360 A | | 11/1991 | Kelly .......................... 395/800 |
| 5,095,421 A | * | 3/1992 | Freund ....................... 709/104 |
| 5,617,514 A | | 4/1997 | Dolby et al. ................. 395/51 |
| 5,630,025 A | | 5/1997 | Dolby et al. ................. 395/51 |
| 5,852,818 A | * | 12/1998 | Guay et al. ..................... 707/1 |
| 6,233,585 B1 | * | 5/2001 | Gupta et al. ................ 707/103 |
| 6,453,269 B1 | * | 9/2002 | Quernemoen ............... 702/186 |
| 6,542,854 B2 | * | 4/2003 | Yang et al. .................. 702/186 |
| 6,542,893 B1 | * | 4/2003 | Quernemoen ............... 707/100 |
| 2002/0069102 A1 | * | 6/2002 | Vellante et al. ............... 705/10 |

OTHER PUBLICATIONS

Compaq Computer Corporation, "White Paper", 5 pages, Jun. 1998.
Kim Shanely, "History and Overview of the TPC", 14 pages, Feb. 1998.
"TPC–C Results—Revision 3X", downloaded from www.t-pc.org, 4 pages, dated prior to Feb. 29, 2000.
"TPC–R Benchmark", downloaded from www.tpc.org, 2 pages, dated prior to Feb. 29, 2000.
"TCP–H Benchmark", downloaded from www.tpc.org, 2 pages, dated prior to Feb. 29, 2000.
Jack Stephens, "TPC–D The Industry Standard Decision Support Benchmark", 28 pages, dated prior to Feb. 29, 2000.
Select pages from www.tpc.org, 12 pages, downloaded Nov. 2, 1999.
User Guide, Compaq System Sizer v8.1 for Oracle8i NT4.0, Compaq Computer Corporation, Jun. 1999, pp. 1–40.
User Guide, Compaq Sizer 2.30 for Microsoft SQL Server 7.0, Compaq Computer Corporation, Oct. 1999, pp. 1–44.
"TPC–D Benchmark", downloaded from www.tpc.org, 6 pages, dated prior to Feb. 29, 2000.

* cited by examiner

Primary Examiner—Charles Rones
(74) Attorney, Agent, or Firm—Charles A. Johnson; Mark T. Starr; Crompton, Seager & Tufte, LLC

(57) ABSTRACT

A computerized method enabling a user to specify and select a server for a database management system. The computerized method can include software modules for specifying the hardware required to handle the database and the transaction processing. The hardware required to handle the database such as the mass storage and memory can be estimated using either estimated or detailed inputs. When using the detailed inputs, the database composition of each table can be described in great detail, including details about the columns and rows. The hardware required to handle the transaction processing such as the number of processors and the LAN speed can be estimated using either the required transactions per second or the detailed SQL composition for each transaction. A comparator function can allow comparison between two systems in terms of performance ratios and price to performance ratios.

15 Claims, 13 Drawing Sheets

FIG. 6

ESTIMATED ASSUMPTIONS FOR SQL SERVER 6.5, CALCULATING MASS STORAGE REQUIREMENT

PARAMETERS USED IN BOTH ESTIMATED AND DETAILED CASES

| | DEFAULT | CURRENT | NEW | UNIT |
|---|---|---|---|---|
| PAGE SIZE, NON-SETTABLE | 2048 | 2048 | | B |
| FILL FACTOR | 95 | 95 | 95 | % |
| LOG FILE SPACE, PERCENT | 25 | 25 | 25 | % |
| TEMPORARY SPACE, PERCENT | 35 | 35 | 35 | % |
| OS AND APPLICATION SOFTWARE, GB | 1 | 1 | 1 | GB |
| SYSTEM DATABASES, GB | 0.1 | 0.1 | 0.1 | GB |
| PERCENT GROWTH IN DATABASE | 25 | 25 | 25 | % |
| PAGEFILE SPACE, PER CENT OF MEMORY SIZE | 110 | 110 | 110 | % |

ASSUMPTIONS USED ONLY IN ESTIMATED CASE

| | DEFAULT | CURRENT | NEW | UNIT |
|---|---|---|---|---|
| AVG NO. OF NON-CLUSTERED INDEXES / TABLE | 0.3 | 0.3 | 0.3 | |
| AVG NO. OF FIXED LENGTH FIELDS / NON-CLUSTERED INDEX | 1.2 | 1.2 | 1.2 | |
| NO. OF VARIABLE LENGTH FIELDS / NON-CLUSTERED INDEX | 0 | 0 | 0 | |
| AVG NO. OF CLUSTERED INDEXES / TABLE | 1 | 1 | 1 | |
| AVG NO. OF FIXED LENGTH FIELDS / CLUSTER INDEX | 1.3 | 1.3 | 1.3 | |
| NO. OF VARIABLE LENGTH FIELDS / CLUSTER INDEX | 0 | 0 | 0 | |

[OK] [CANCEL] [USE DEFAULTS] [COMMENTS]

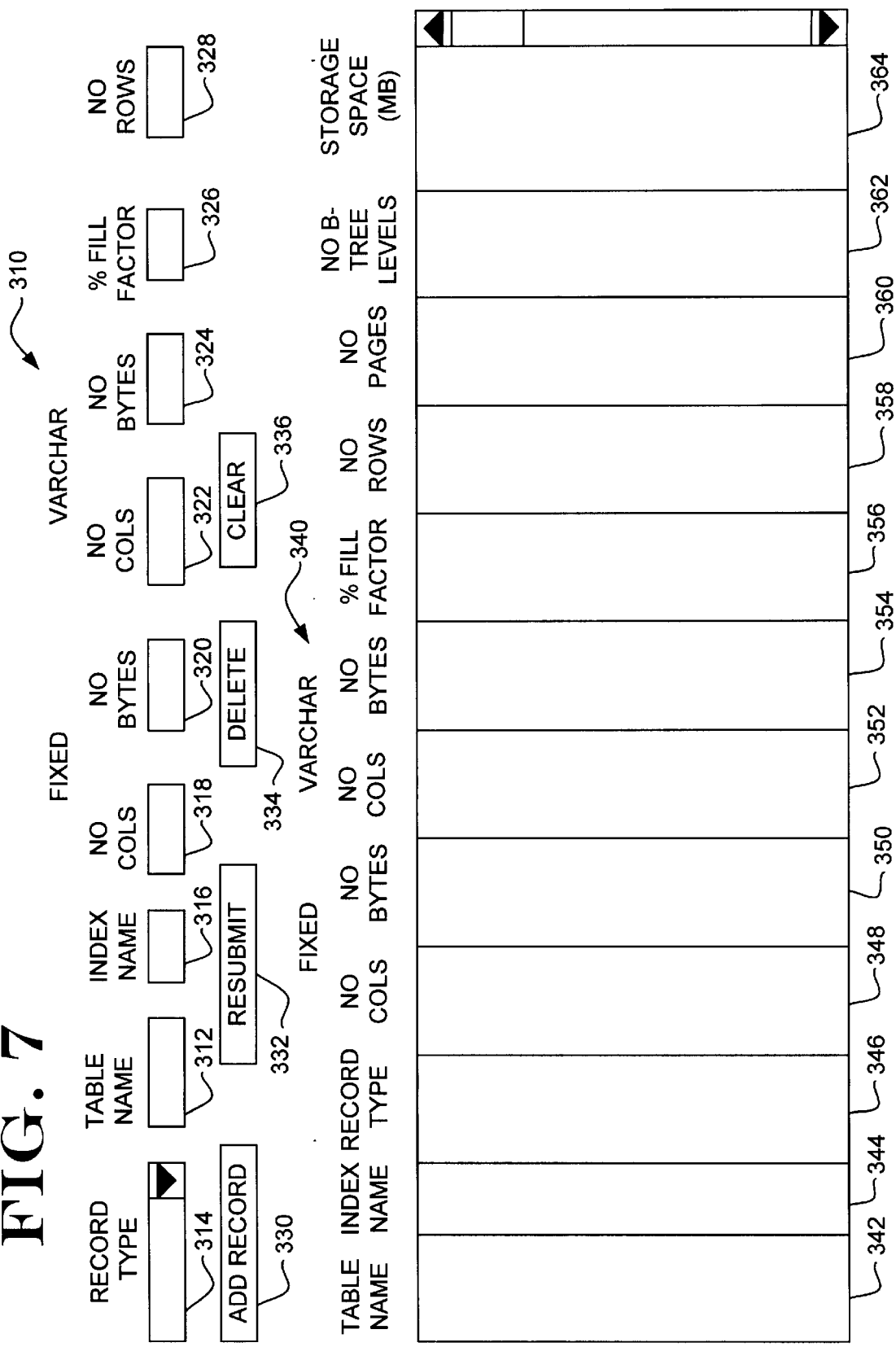

SYSTEM REQUIREMENTS 550

| | | |
|---|---|---|
| WORKLOAD | OLTP USER DEFINED | 554 |
| DATABASE SOFTWARE | SQL SERVER 7.0 | 556 |
| SYSTEM | UNISYS ES2XXX/ES5XXX | 558 |
| PROCESSOR | 500 MHZ PII/PIII XEON | 560 |
| TXN/SEC REQUIREMENT | 200 | 562 |
| MAX CPU UTILIZATION, % | 85 | 564 |
| CPU REQUIREMENT | 2 | 566 |
| EFFECTIVE CPU UTILIZATION, % | 48 | 568 |
| MEMORY REQUIREMENT, MB | 1024 | 570 |
| MASS STORAGE REQUIREMENT, GB | 6259 | 572 |
| COMMUNICATIONS REQUIREMENT | 100 MBIT ETHERNET | 574 |
| COMMUNICATIONS BYTES/SEC | 582,763 | 576 |
| COMMUNICATIONS UTILIZATION, % | 50 | 578 |

FIG. 13

COMBINATION OF MASS STORAGE SIZER, COMPARATOR, OLTP USER DEFINED WORKLOAD SIZER, AND DESIGN

RELATED APPLICATIONS

The present application is related to the following co-pending applications filed on date even herewith: U.S. Pat. No. 6,542,893, issued, Apr. 1, 2003, entitled DATABASE SIZER FOR NT SIZER SYSTEM; U.S. patent application Ser. No. 09/515,310, current pending, filed Feb. 29, 2000, entitled SIZING SERVERS FOR DATABASE MANAGEMENT SYSTEMS VIA USER DEFINED WORKLOADS; U.S. patent application Ser. No. 09/515,158, filed Feb. 29, 2000, currently pending, entitled BUILT IN HEADROOM FOR AN NT SYSTEM SIZER; U.S. patent application Ser. No. 09/516,272, filed Feb. 29, 2000, currently pending entitled ALGORITHMS TO CALCULATE MASS STORAGE REQUIREMENTS FOR NT SIZER; and U.S. Pat. No. 6,453,269, issued Mar. 1, 2000, entitled METHOD OF COMPARISON FOR COMPUTER SYSTEMS AND APPARATUS THEREFORE. All of the aforementioned co-pending patent applications are hereby incorporated by reference.

FIELD OF THE INVENTION

The present invention is related generally to software and computer programs. More specifically, the present invention is related to software for sizing and specifying database management system hardware.

BACKGROUND OF THE INVENTION

Relational databases came into common use in computers over twenty years ago. Despite improvements in database software and new methodologies, relational databases remain the mainstay of database management systems. Hardware vendors originally supported proprietary database management systems which ran primarily on machines manufactured by the hardware vendor. Software developers later developed database management systems that were more open and ran on computers made by several vendors. The database management systems were also ported to run under various operating systems. This gave the advantage of spreading the cost of development over more sites and also uncoupled the dependence between hardware vendors and software vendors. Third party support and training became more common.

Database management systems also became separated into client-side software and server-side software. This meant that the server-side software was decoupled from software having to do with the display, use, and formatting of the data received from the database. In particular, server-side software often handled mostly queries of existing data along with updates of existing data and insertion of new data.

Modem electronic commerce, such as commerce over the Internet or business-to-business electronic commerce, has placed increased demands on many servers. This has also made frequent upgrades necessary. Company mergers and acquisitions frequently make it necessary to incorporate large amounts of data from unexpected sources. Customer expectations also make it necessary to upgrade hardware to keep up with the faster response times users expect even though system loads may be increasing as well.

When upgrading or replacing database servers, it is necessary to have a good idea as to the size of the database that will have to be implemented on the new server. The data storage as well as storage of many different indices will all increase the amount of data required. It may be necessary to come up with a good estimate of the required amount of mass storage in a short time period, as during bid evaluations, during sales presentations, or repeatedly during scenario building. The person supplying the input may have only a rough idea as to what the database mass storage requirements are.

In some situations, a required or desired transaction handling capability is based mainly on the capability of a known system. It may be the case that a given brand name DBMS server is believed to satisfy a current or future requirement, and the tpmC (a standardized transactions per second benchmark) capability of that DBMS server is available from the vendor and/or from the tpmC organization database. A better performance value could, in theory, be derived from a series of more specific user supplied information or requirements. It may be the case that the user has a more specific idea about what the requirements are for a system, such as detailed transaction specific information.

If a system were created for determining hardware requirements for a DBMS, it would be desirable to allow for some margin or headroom in capacity. If a system was specified to run too close to capacity, then it might fall behind and deny service when bursts of activity exceeded the average workload. It might be desirable to factor in hardware utilization limits for hardware components. An upper utilization limit could reduce the likelihood of over-capacity and the resulting bottleneck. A lower utilization limit could reduce the likelihood of under-capacity and the resulting excessive spending.

What would be desirable are methods for calculating the data storage requirements for a relational database table not requiring interatively calculating the number of number of index levels, the number of data pages, the number of index pages, and the data storage requirements for relational database systems, capable of using either estimated or detailed requirements as input. What would be useful are methods capable of determining required server size based on either required transaction processing benchmarks on more detailed SQL processing requirements, while factoring in hardware utilization limits. A system having capabilities for sizing, specifying, and comparing DBMS systems all in the same software package would be desired.

SUMMARY OF THE INVENTION

The present invention provides a computerized method for use by a human user for sizing, specifying, and comparing hardware for database management systems. The present invention includes sizing, specifying, and comparison functions all in one commonly accessible software package which can share information between the various functionalities. The computerized method preferably includes software executable on a general purpose computer by an end user.

The software can accept a variety of inputs from a user in order to size and specify the hardware required to run the DBMS software. The inputs can include a DBMS software system name selectable from a list of DBMS software systems. Such a list can include, for example, DBMS software systems including SQL Server and Oracle, including various versions or releases of these systems. The inputs can also include required database input parameters and required transaction workloads. In one system, the mass storage is calculated in terms of gigabytes of disk space needed to hold the database tables and indices required to handle the database specified by the user inputs. The present invention can then calculate the required database mass storage size as a function of the database input parameters. The computerized system can also determine the hardware required to handle the transaction processing rate. The required hardware can include the number of processors, the processor speed, and the number and speed of network interface cards.

In one system, the input parameters include estimates such as a number of tables, a total amount of data, an average number of columns per row, an average row size, a percent variable length columns, and an average size of variable length columns per table. In one system, the database input parameters include page size, a fill factor, an average number of non-clustered indexes per table, an average number of fixed length fields per non-clustered index, an average number of clustered indexes per table, and a number of variable length fields per cluster index.

In one aspect of the invention, the transaction workload is specified at least in part by a required transactions per minute value. One software portion can specify the transaction workload at least in part by specifying a composition for a plurality of transactions. In one software portion, a plurality of SQL statements is specified for each of the transactions. In another software portion, each SQL statement includes at least one SQL parameter such as the number of records the SQL statement operates upon.

In systems accepting either detailed transaction compositions or higher level workload compositions, the workload can be determined and output in a standard format such as the tpmC format used by the Transaction Processing Performance Council (TPC) organization. The tpmC values measuring the workload can be used to call up various systems having data in a database such as the TPC-C database. The comparator portion of the system can then be used to compare two systems to each other, comparing the two tpmC values and comparing the two prices and/or price per performance values.

BRIEF DESCRIPTION OF THE DRAWINGS

FIG. 6 is an illustration of a computer display screen for entering input assumptions for estimated and detailed mass storage calculations;

FIG. 7 is an illustration of a computer display screen for entering input parameters for a detailed mass storage size calculation and for display the calculation results;

FIG. 13 is an illustration of a computer display screen for displaying the mass storage, workload, communication, and hardware summaries for the DBMS system sized according to the present invention.

DETAILED DESCRIPTION OF THE INVENTION

Figure 1:
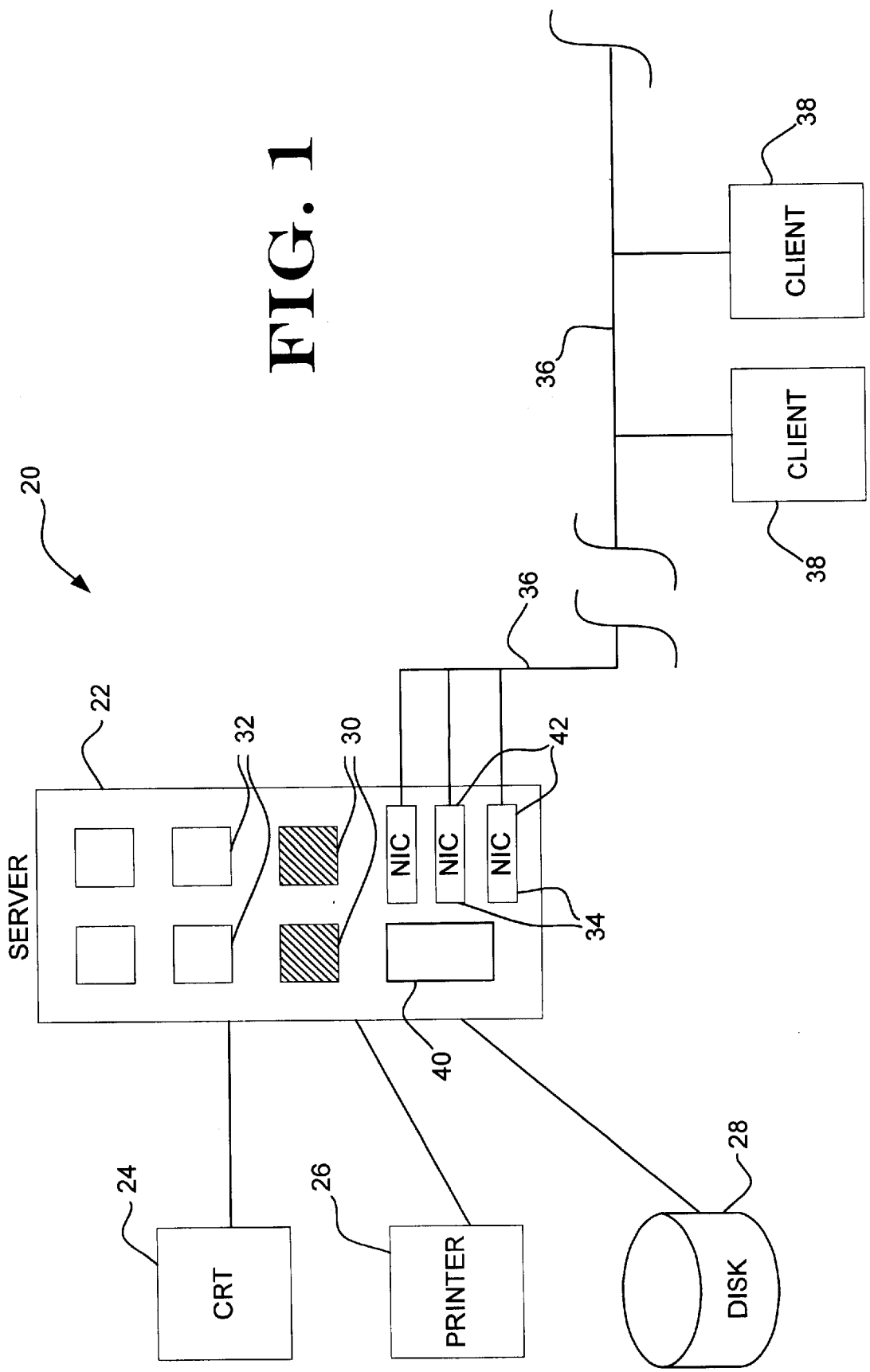
FIG. 1 is a highly diagrammatic schematic of a computer system including a database server.

FIG. 1 illustrates generally a database server system 20 including a server 22 supported by a CRT 24 and a printer 26 for programming, display, maintenance, and general Input/Output uses. Within server 22 is illustrated several CPU sockets 30 and 32, with CPU sockets 30 being populated with CPUs and CPU sockets 32 remaining empty for future expansion and population. Server 22 also includes a memory portion 40 which can contain a sufficient quantity of Random Access Memory (RAM) to meet the server's needs. A disk 28 is illustrated for mass storage, which can include disk drives or any other technology capable of holding the contents of the databases or databases to be managed. Several Network Interface Cards (NICs) 42 are illustrated as part of server 22 and are coupled to a network illustrated by a network link 36 which can be any communication link including Local Area Networks, Wide Area Networks, Ethernet, and the Internet.

Also connected to data link 36 are client computers 38. Software clients can, in fact, reside on the same machine as the server, but in common practice, the client processes usually run on a different machine. In one embodiment, server 22 is a computer running on the Microsoft NT operating system and clients 38 are smaller computers running a Microsoft Windows operating system.

Server 22 is preferably scaleable, having extra socketed capacity for memory, processors, NICs, and disk drives. This allows extra CPUs, memory, NICs, and mass storage such as disk drives to be initially set to meet current needs and later expanded to meet changing needs.

Figure 2:
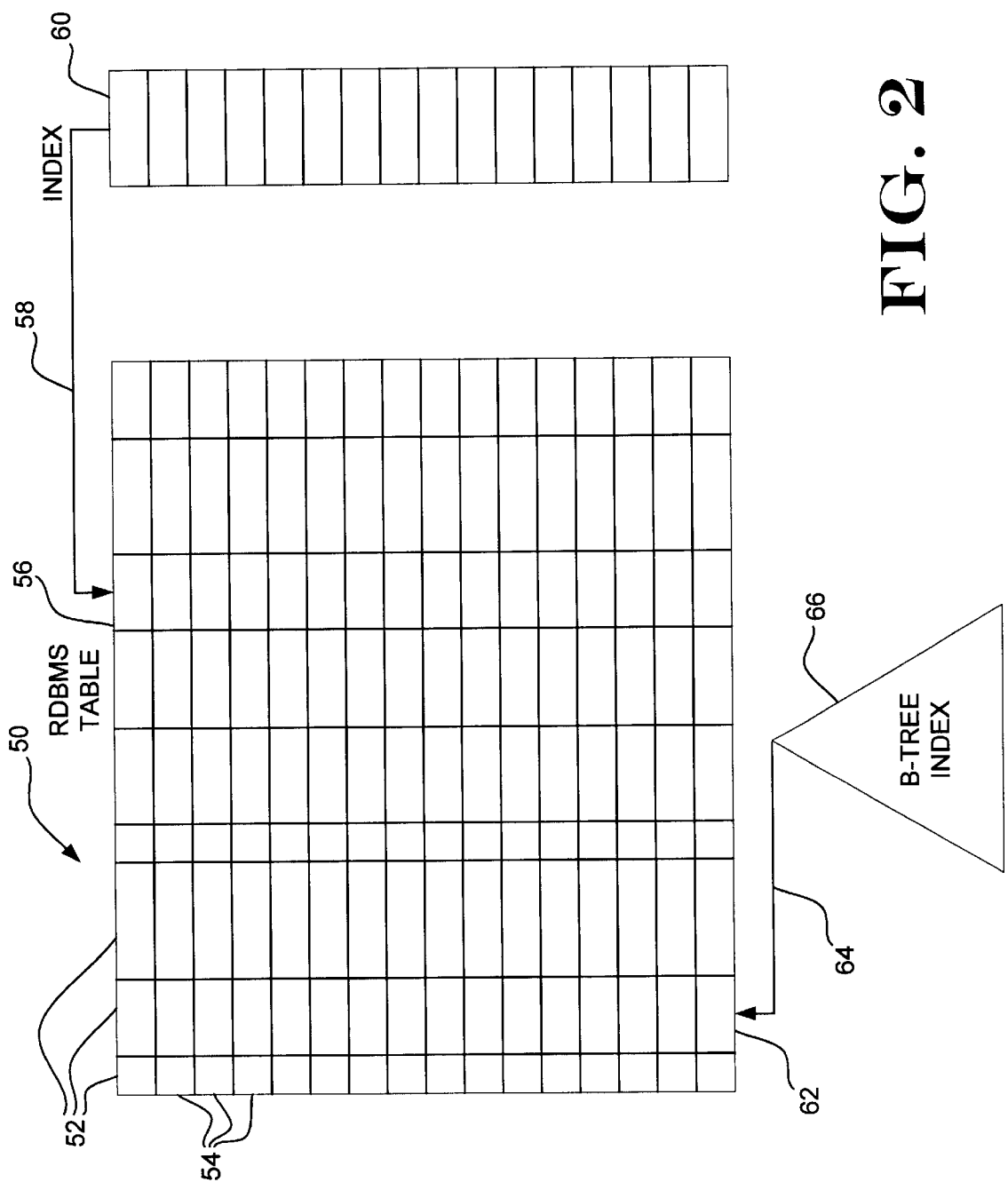
FIG. 2 is a highly diagrammatic view of a relational database.

Servers such as server 22 often exist to contain and manage data bases, such as hose contained within relational database management systems (RDBMS). RDBMS include tables formed of rows or records and columns. FIG. 2 illustrates an RDBMS table 50 formed of several columns 52 and several rows or records 54. Columns 52 typically include both fixed length or width columns and variable length or width columns, where the variable length may be allocated out of a common buffer elsewhere outside of the table itself. In practice, an RDBMS system has numerous tables to be stored and managed.

It is possible for rows 54 to be ordered according to one of the columns. In practice however, the records are typically not ordered, but are linked to indices that are ordered. In a simple example, one of columns 52, such as column 56, may contain a person's social security number and be linked via a software link 58 to an ordered index 60 which contains a sorted list of social security numbers along with the record number at which the corresponding record resides. Such a sorted list of only one column of table 50 can shorten a search from order n to order log n. Such a sorted list still requires sorting upon the addition, deletion, and change of data.

A commonly used index method is illustrated for column 62, which is linked via a software link 64 to a B-tree index 66. B-tree 66 can contain a multi-level tree well known to those skilled in the software arts. B-tree 66 can be a multi-way tree such as an AVL tree or a 2–3 tree. B-tree indices have the advantage of being quick and easy to modify, without requiring massive amounts of sorting such as in a linear sorted index such as index 60. In particular, a B-tree can be maintained in a balanced condition with the addition of data to avoid skewing the shape of the tree. Maintaining the balance of the tree allows a log n search time to be maintained as well.

In practice, an RDBMS may use only a B-tree for the indexing scheme, due to its utility and flexibility. An RDBMS may maintain a B-tree on any column for which ordered searching may be later requested. As the number of columns to be indexed approaches the number of columns in the table, the data storage requirements for the indices themselves approach and pass the data storage requirements of the table itself. Thus, the data storage requirements of the indices are an important factor to be considered when determining the mass storage requirements for a table and RDBMS.

Figure 3:
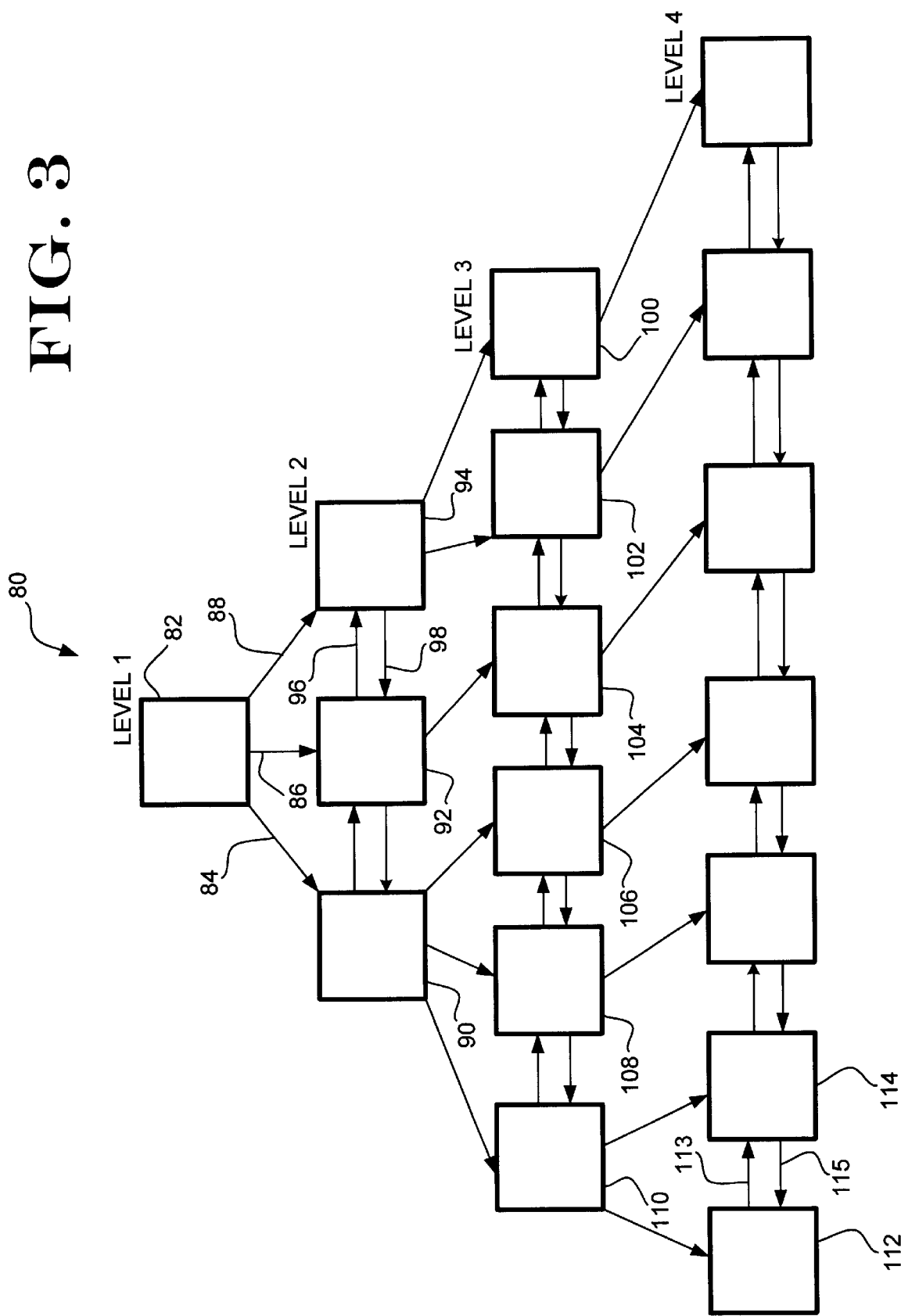
FIG. 3 is a highly diagrammatic view of a B-tree index for a relational database.

FIG. 3 illustrates a B-Tree 80 including a root node 82 at level 1 having three links 84, 86, and 88 to nodes 90, 92, and 94 respectively at level 2. The nodes at level 2 are illustrated as being doubly linked themselves through links such as links 96 and 98. Links between nodes at the same level, such as links 96 and 98, make maintenance of the B-tree somewhat easier, and browsing can be made somewhat easier as well through use of such links. At level 3, links 100, 102, 104, 106, 108, and 110 are pointed to by the links at level 2. Level 4 is the last level in the tree. B-tree 80 has four levels, or a tree height of four. Level 4 may be said to be the "failure level" of the tree, as level 4 is the level at which a search of the tree will fail if it is to fail. If a value such as a social security number is searched for but there is no such record in the database, level 4 is the level at which the search will fail. At level 4, nodes 112 and 114 are linked together as a doubly linked list by links 113 and 115. In practice, the failure level of a B-Tree is often linked together in this or a similar manner.

In a B-tree, the nodes in the B-tree typically contain only the key or column values the tree is ordered for and points to nodes in the next level related to those keys or column values. For example, in a two-way tree, a node would have one index value, and two pointers, indicating which nodes to go to for values greater than or less than the index value, respectively. B-Trees and databases vary in what they have at the failure level. In some databases, herein termed "physical ordered databases", the failure level has the records themselves linked together. In these databases, once the failure level is reached, the record has been obtained, with no further I/O necessary to obtain the record. In other databases, herein termed "non-physical ordered databases", the nodes at the failure level contain only pointers or record numbers into the main table. In these databases, another I/O is required to obtain the record of interest. In some databases, the failure level contains neither the record of interest nor a pointer to the record of interest. Instead, a unique key is contained, requiring a search on that key to obtain the record of interest. For example, a search of B-Tree ordered on last name plus first name may return only a social security number upon successful completion. Another B-tree or highly optimized index based on social security number can then be rapidly searched for the record of interest. In this scheme, at least one more I/O is required after the failure level has been reached. The number I/Os required to reach a record is of interest because it determines in part the speed of the database. Both disk I/O and network I/O require latent time to process.

In sizing a database, the RDBMS typically has a page size, or an aggregate unit of mass storage typically numbering thousands of bytes. The page size on some computers may be determined in part by operating system and disk system factors. The page size may also be determined by a desire to keep the width of internal variables within the database to manageable limits. The page size is fixed in some RDBMSs and selectable in other RDBMSs.

The amount of mass storage required for a single table is a function of several variables, such as the number of rows or records and the number of columns. The database storage required is not a simple calculation of the row size and column sizes for several reasons. First, the column sizes or widths may be variable. Second, the page size enters into the calculation in a non-continuous manner, as some database allocation such as record allocation must lie within a single page rather than cross page boundaries, with some space wasted as a result. Third, some space in a page is set aside for future expansion or reserved for use a buffer space, as when re-ordering data. Fourth, not all space within a page is available for end user data storage, with some being used by the RDBMS itself or for other overhead. In particular, in some RDBMSs, a fraction of each page is specified as not available for initial storage. In some RDBMSs, a number of rows are set aside as non-usable. In some RDBMSs, a fraction of each record is set aside as non-usable. As previously mentioned, the size of the indices may be a large portion of table storage even though the data itself may not be stored within the indices. All of the aforementioned factors makes sizing the required databases a complicated matter, as is dealt with below.

Figure 4:
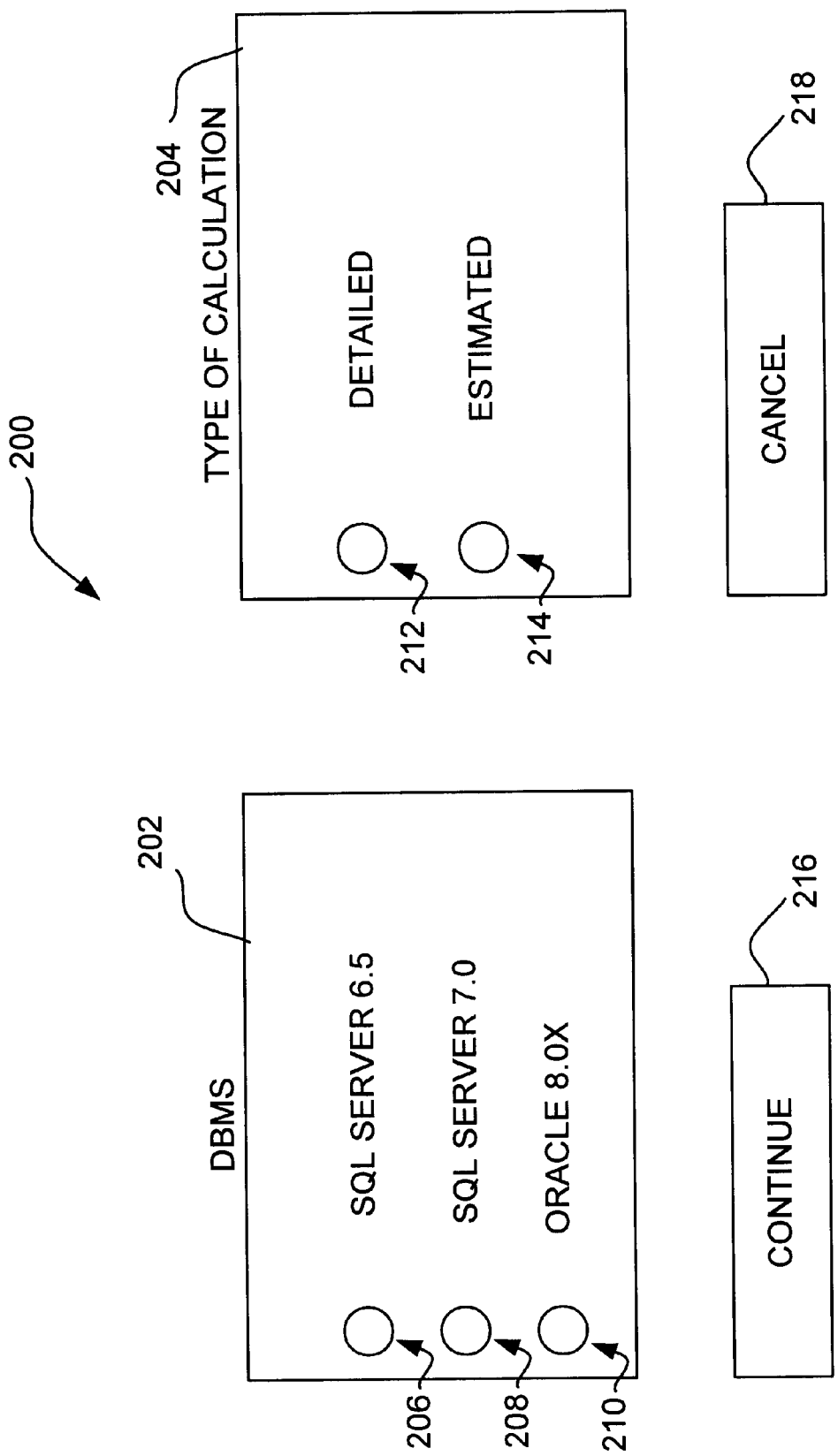
FIG. 4 is an illustration of a computer display screen for selecting DBMS software and selecting a type of mass storage calculation to be performed.

FIG. 4 is an illustration of a computer display screen 200 for selecting DBMS software and selecting a type of mass storage calculation to be performed. In the illustrative embodiment, a DBMS selection window 202 includes a radio button 206 for selecting SQL server 6.5 as the DBMS, a radio button 208 for selecting SQL server 7.0 as the DBMS, and a radio button 210 for selecting Oracle 8.0X as the DBMS. Selecting the DBMS is required in most embodiments as the DBMS selected has an effect on the mass storage calculation and the transaction processing calculations.

A type of calculation window 204 includes a radio button 212 for selecting a detailed mass storage calculation and a radio button 214 for selecting an estimated mass storage calculation. The estimated option allows for use of an estimated method for calculating the mass storage requirement while the detailed option allows for use of a more detailed method for calculating the mass storage requirement. A cancel button 218 allows the user to cancel the session, while a continue button 216 allows the user to continue with the program.

Figure 5:
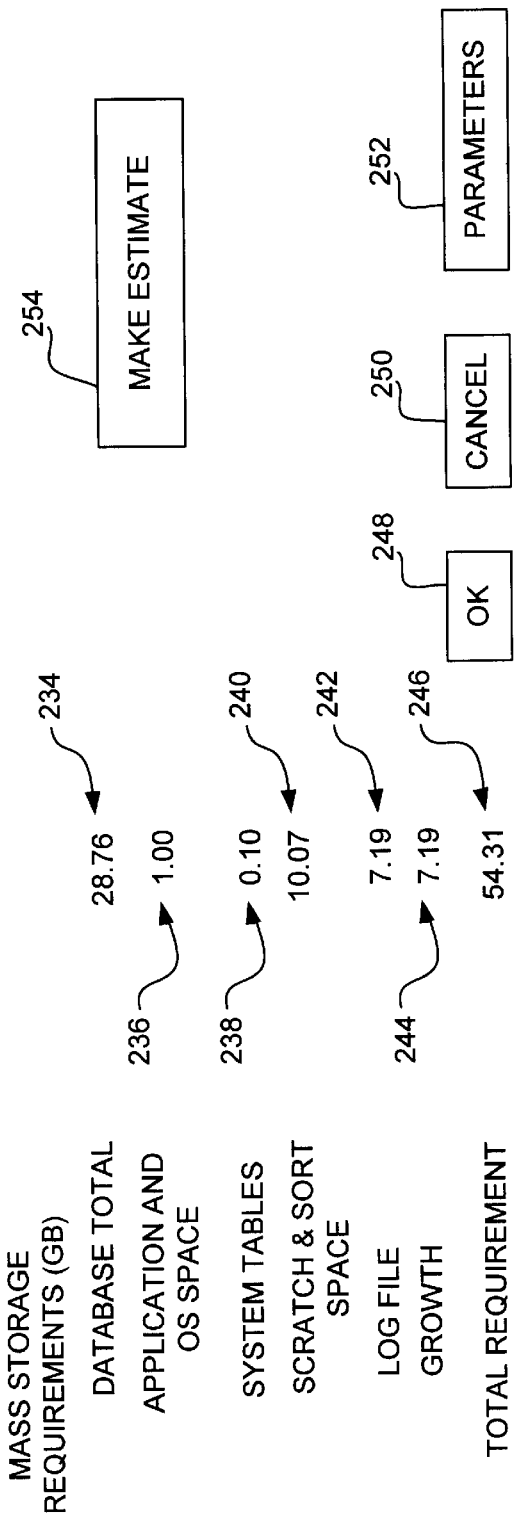
FIG. 5 is an illustration of a computer display screen for entering input parameters for an estimated mass storage size calculation and for displaying the calculation results.

FIG. 5 is an illustration of a computer display screen for entering input parameters for an estimated mass storage size calculation and for displaying the calculation results. The display screen can be used to enter input parameters for the estimation method for determining the mass storage required for the DBMS. The estimation method, as well as the detailed method, is discussed in related applications U.S. patent application Ser. No. 09/516,272, filed Feb. 29, 2000, entitled ALGORITHMS TO CALCULATE MASS STORAGE REQUIREMENTS FOR NT SIZER and U.S. patent application Ser. No. 09/515,308, filed Feb. 29, 2000, now U.S. Pat. No. 6,542,893, issued Apr. 1, 2003, entitled DATABASE SIZER FOR NT SIZER SYSTEM, herein incorporated by reference.

For using the estimated method, a number of tables entry window 222 is provided, along with a total data amount entry window 224, an average number of columns per row entry window 226, a percent variable length windows entry window 230, and an average size of variable length columns per table window 232. The algorithms in the above referenced patent applications can be used to calculate the estimated mass storage requirement which can be displayed in a database total window 234. The space required for the operating system and application can be determined at least in part from the selection of the DBMS and operating system (OS) and displayed in an application and OS space window 236. Other outputs from the mass storage algorithms can be displayed in a system tables window 238, a scratch and sort space window 240, a log file space window 242, and a growth window 244. The various mass storage requirements can be summed and displayed in a total mass storage requirement window 246. The total mass storage requirement window 246 can indicate the total disk storage required for the database, operating system, and future growth.

Display screen 220 includes a make estimate button 254 for requesting that a mass storage requirement estimate be calculated. An OK button 248 can be used to store the results of the calculation and a cancel button 250 can be used to cancel the calculation. A parameters button 252 can be used to proceed to a parameters entry screen.

FIG. 6 is an illustration of a computer display screen 260 for entering input assumptions for estimated and detailed mass storage calculations. Display screen 260 includes a top portion 262, for entering parameters used for both the estimated and detailed mass storage determination methods, and a bottom portion 264, for entering assumptions used for only the estimated mass storage determination method. Display 260 includes a default display column 266 for displaying the default values, a current display column 268 for displaying the currently used values, a new display column 270 for entering and displaying user entered values, and units column 272 for displaying the units of the values.

Top display portion 262 includes a page size row 274 displaying the page size currently in use. The page size is typically a function of the DBMS selected and cannot be changed by the user. A fill factor row 276 can be used to enter the percent fill factor for the database, indicating the percent of the database storage capacity that is available to store data. A log file space percent row 278 can be used to enter the mass storage required for log files, expressed as a percent of the data base. A temporary space row 280 can be used to enter the mass storage required for temporary or scratch space, indicated at 240 in FIG. 5. An operating and application software row 282 can be used to enter the size required for the operating system and applications software. In some embodiments, the value displayed in the default column for this row is determined as a function of the operating system selected on a different display screen. A system databases row 284 can be used to enter the required space for system databases. A percent growth row 286 can be used to enter the percent that should be allowed for future growth of the database. A pagefile space row 288 can be used to enter the pagefile space required in mass storage, expressed as a percent of the memory size.

Bottom display portion 264 can be used to enter assumptions used by the estimated mass storage determination method. An average number of non-clustered indexes per table can be displayed and entered in row 290. An average number of fixed length fields per non-clustered index can be entered in row 292. The average number of variable length fields per non-clustered index can be entered in row 294. The average number of clustered indexes per table can be entered in row 296. The average number of fixed length fields per cluster index can be entered in row 298. The number of variable length fields per cluster index can be entered in row 300. In one embodiment, upon completion of entry of the values for the fields in FIG. 6, the estimated method may be used to determine the required mass storage required for the system. The method described in co-pending application U.S. patent application Ser. No. 09/515,308, filed Feb. 29, 2000, entitled DATABASE SIZER FOR NT SIZER SYSTEM and U.S. patent application Ser. No. 09/515,158, filed Feb. 29, 2000, entitled BUILT IN HEADROOM FOR AN NT SYSTEM SIZER, can be used to determine the mass storage requirements.

FIG. 7 is an illustration of a computer display screen 310 for entering detailed input parameters for a detailed mass storage size calculation and for displaying the calculation results. Display screen 310 can be used to enter data needed to determine the size required for each table when the detailed method of mass storage determination is used. A table name can be entered in table name entry window 312, with the remainder of the display screen displaying records only for records in that table. In this way, each table in the database can be specified and populated with records to determine the required storage size for the table using the detailed method.

A record type entry window 314 can be used to enter record types from a drop down list and can include record types such as data, clustered index, or index. An index name entry window 316 can be used to specify an index name so that an index type record can be called up by name. For fixed length fields, a number of columns entry window 318 and a number of bytes entry window 320 can be used to enter these two values. For variable length fields, a number of columns entry window 322 and a number of bytes entry window 324 can be used to enter these two values. A percent fill factor window 326 can be used to enter the fill factor for that record. The number of rows entry window 328 can be used to enter the number of rows of that record type.

An add record button 330 can be used to add the newly entered record to the table. A resubmit button 332 can be used to resubmit a modified record to the table. A delete button 334 can be used to delete a record from a table. A clear button 336 can be used to clear the fields for the record.

A bottom portion window 340 can be used to display multiple records at the same time. A slider bar can be used to scroll through all the records in the system. Display window 340 includes counterparts to the data entry fields discussed above, including a table name column 342, an index name column 344, a record type column 346, a fixed number of columns column 348, a fixed number of bytes column 350, a variable length number of columns column 352, a variable length number of bytes 354, a fill factor column 356, and a number of rows column 358. Display window 340 also includes columns having calculated or derived values, including a number of pages column 360, a number of B-tree levels column 362, and a storage space column 364. The values for the calculated values can be calculated using methods and algorithms described in co-pending applications U.S. patent application Ser. No. 09/516,272, filed Feb. 29, 2000, entitled ALGORITHMS TO CALCULATE MASS STORAGE REQUIREMENTS FOR NT SIZER and U.S. patent application Ser. No. 09/515,308, filed Feb. 29, 2000, entitled DATABASE SIZER FOR NT SIZER SYSTEM. Display screen 310 thus allows for specification of tables based on detailed information about the records in each table.

Figure 8:
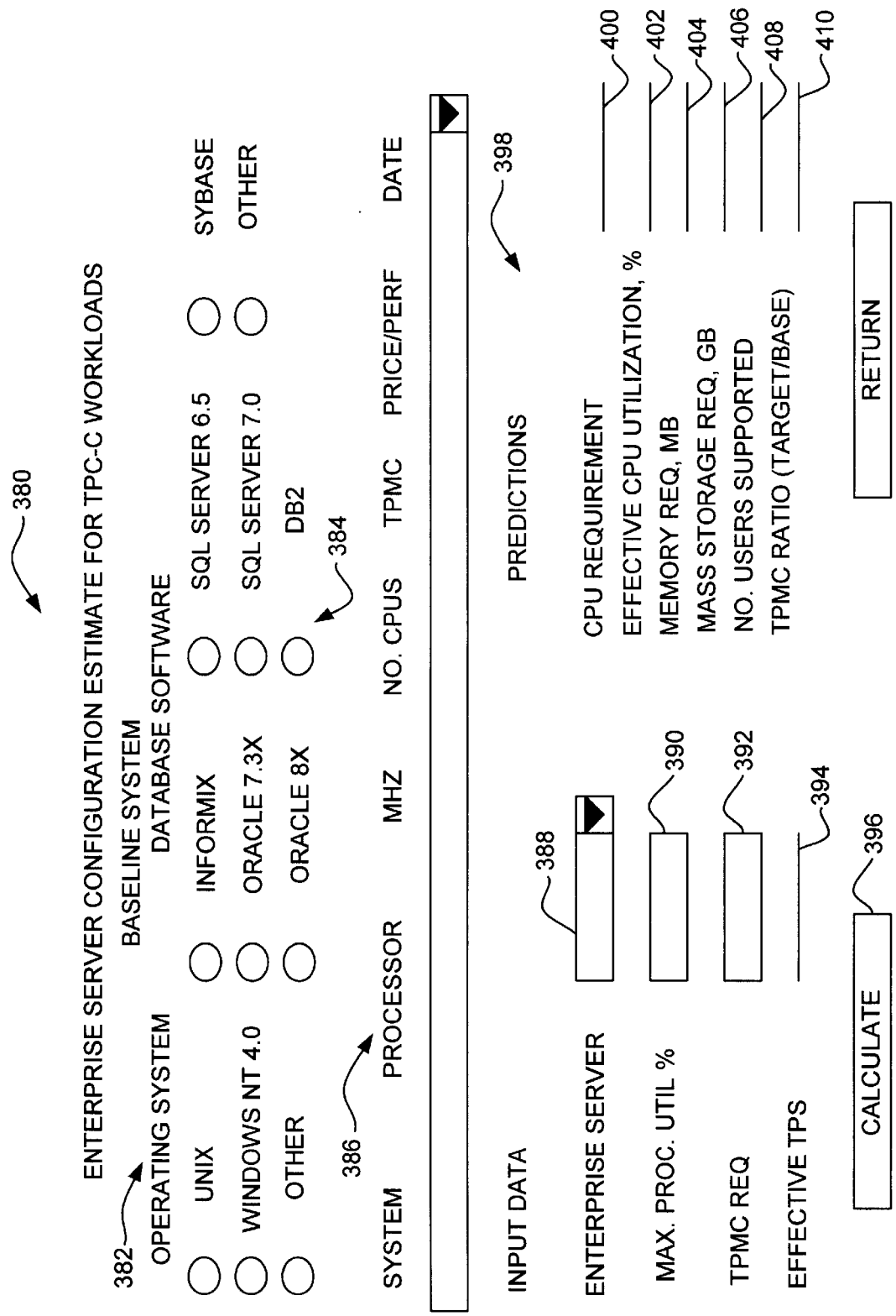
FIG. 8 is an illustration of a computer display screen for selecting operating systems, DBMS software, and TPC workload records, and for displaying predicted CPU and memory requirements.

FIG. 8 is an illustration of a computer display screen 380 for selecting operating systems, DBMS software, and TPC workload records, and for displaying predicted CPU and memory requirements. The top portion deals with a baseline system to be used for comparison purposes. The bottom portion deals with a target system, the specified system, to be compared to the baseline system. Display screen 380 includes several radio buttons 382 for selecting the operating system to be used. DBMS selection radio buttons 384 can be used to select from among several DBMS software systems, for example, SQL server 6.5, SQL server 7.0, and Oracle 8.X. Operating system selection buttons 382 and DBMS selection buttons 384 can be used to narrow the selection of records from a database such as the TPC database having records which can be sorted and selected for matches on both operating system and DBMS, greatly reducing the number of choices available. In one embodiment, the operating system radio buttons and DBMS buttons are used to reduce a large number of records to a short number of records, which can then be selected among using a drop down list such as a drop list window 386.

Drop down list window 386 may be used to obtain an idea of the transaction workload magnitude required by the server to be specified, based on the names and attributes of some known servers. In one embodiment, window 386 includes fields corresponding to fields in the TPC-C database, including the system name, the processor name, the processor speed, the number of processors, the tpmC value, the price to performance ratio (dollars per tpmC) and the date of the record. For example, the user may believe that a server similar to one of known name, speed, and number of processors is required. Once a particular server has been placed into the drop down list window, the tpmC value may be obtained for that server. Either the obtained tpmC value or another tpmC value can be used for the remainder of the calculations.

In a preferred embodiment, a drop down list window 388 is used to select from a subset of systems, such as a subset available from a single vendor. A maximum processor utilization entry window 390 can be used to enter the maximum desired processor utilization for the target system. The tpmC value required for the target system can be entered in tpmC entry window 392, with the effective transactions per second displayed in display window 394.

A calculate button 396 can be clicked to initiate calculations to populate a prediction display portion 398 according to methods described in co-pending applications U.S. patent application Ser. No. 09/515,310, filed Feb. 29, 2000, entitled SIZING SERVERS FOR DATABASE MANAGEMENT SYSTEMS VIA USER DEFINED WORKLOADS and U.S. patent application Ser. No. 09/515,158, filed Feb. 29, 2000, entitled BUILT IN HEADROOM FOR AN NT SYSTEM SIZER. The number of CPUs required can be determined for the target system and displayed in CPU requirement display window 400. The effective processor utilization can be calculated and displayed in effective CPU utilization window 402. The memory required and mass storage required can be displayed in windows 404 and 408, respectively. The number of users supported can be calculated and displayed in window 408. The tpmC ratio of the target system to the baseline system can be calculated and displayed in tpmC ratio window 410.

Figure 9:
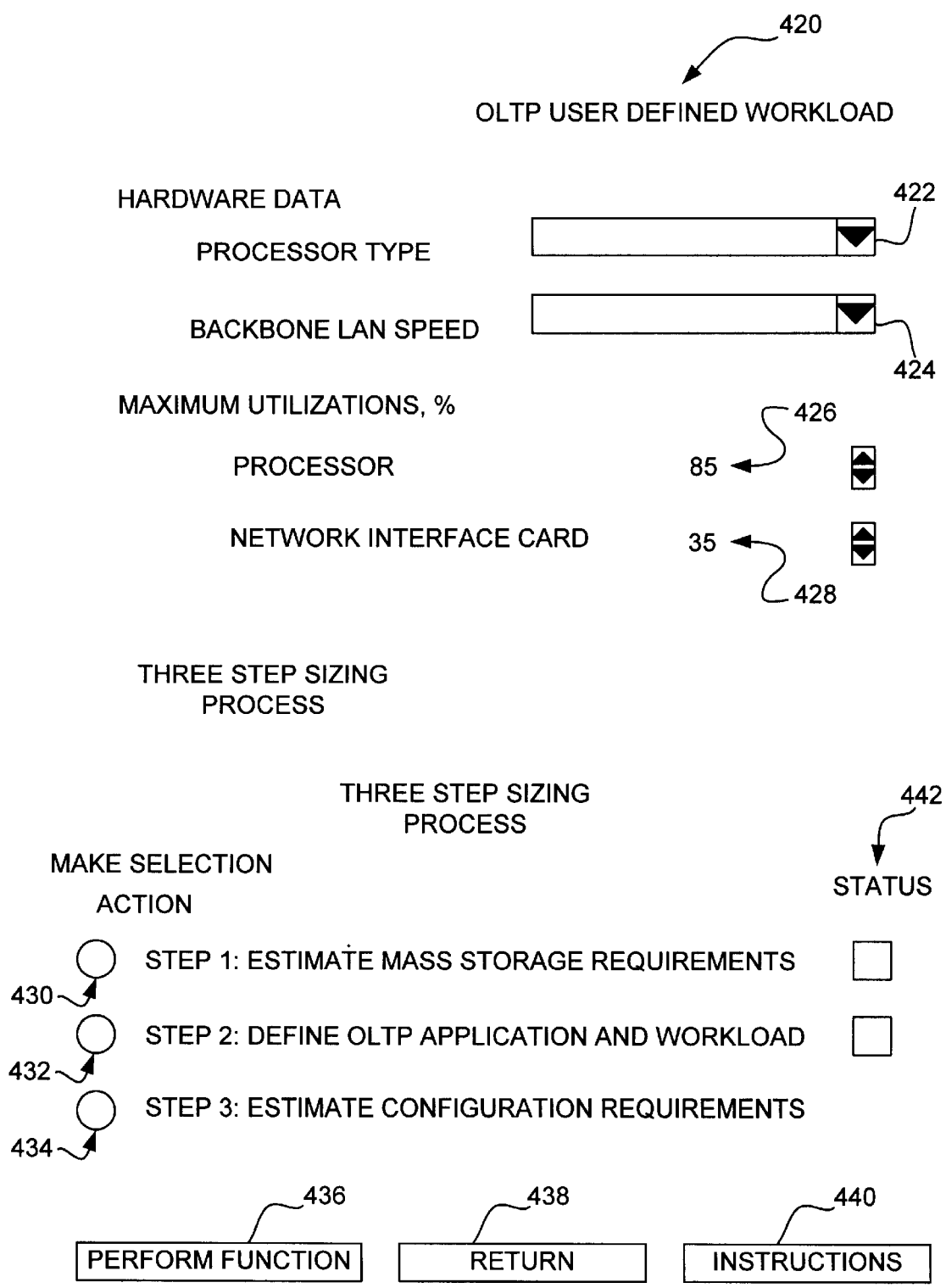
FIG. 9 is an illustration of a computer display screen for defining an on-line transaction processing workload and for progressing through a three step sizing process.

FIG. 9 is an illustration of a computer display screen 420 for defining an on-line transaction processing workload and for progressing through a three-step sizing process. In a hardware data portion of the screen, a drop down list 422 can be used to specify a processor type, such as a 500 MHz ES2/ES5, processors supplied by Unisys. In one embodiment, processors supplied by only one vendor are supplied in the drop down list. A LAN speed drop down list 424 is also provided for specifying a LAN speed. In one embodiment, selections include 10 Mbit Ethernet, 10 MBit Switched Ethernet, 100 Mbit Ethernet, 100 Mbit Switched Ethernet, 1 Gbit Switched Ethernet, and best fit. Best fit allows the program to determine the smallest LAN speed that will satisfy the expected LAN traffic at or below an optimal, maximum utilization. In a maximum utilization portion of the display, a processor maximum utilization 426 can be entered with spin buttons and a network interface card maximum utilization 428 can be entered with spin buttons as well.

Once the processor type, backbone speed, processor maximum utilization, and network interface card utilization are entered, the remainder of the three-step sizing process may be completed. As can be seen from FIG. 9, a three-step process is outlined, having a first step 430 for estimating the mass storage requirements, a second step 432 for defining the online transaction processing application and workload, and a third step 434 for estimating the configuration requirements. Status fields 442 indicate whether the associated step has been taken. A perform function button 436 can be clicked to perform the selected step, and a return button 438 clicked to return to the calling screen. An instructions button 440 can be clicked to bring up a help screen with instructions.

Figure 10:
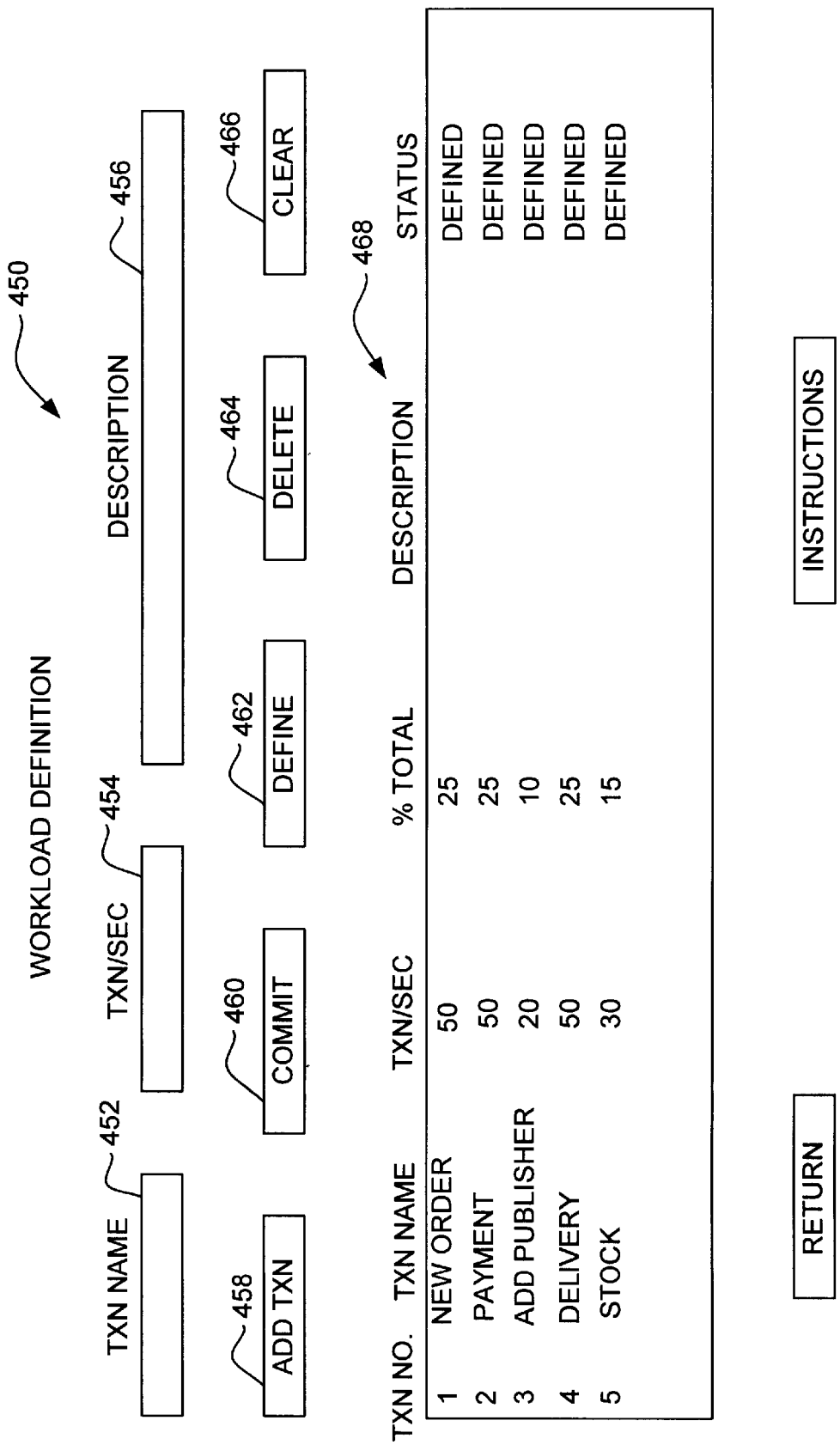
FIG. 10 is an illustration of a computer display screen for adding transaction to define the transaction workload.

FIG. 10 is an illustration of a computer display screen 450 for adding a transaction to define the transaction workload. Display screen 450 includes a transaction name window 452 for entering a transaction name, a transactions per second window 454 for entering the transaction execution rate, and a description window 456 for entering a description of the transaction. An add transaction button 458 can be clicked to create a new transaction, a commit button 460 can be clicked to commit the addition of the newly defined transactions, a define button 462 can be clicked to define a new transaction, a delete button 464 can be clicked to delete a specified transaction, and a clear button 466 can be clicked to clear the screen of all entered values.

A workload display window 468 is included for displaying the multiple transactions that make up the user-defined workload. For each user defined transaction, display window 468 displays a transaction number, a transaction name, a transaction rate, a percent of total workload for that transaction, a description, and a status field indicating whether that transaction has been completely defined. The percent of total column should add up to 100 percent. Display 450 can be used in effect to name the transaction and specify the transaction rate, with the actual composition of the transaction to be specified elsewhere, as discussed in co-pending application U.S. patent application Ser. No. 09/515,310, filed Feb. 29, 2000, entitled SIZING SERVERS FOR DATABASE MANAGEMENT SYSTEMS VIA USER DEFINED WORKLOADS.

Figure 11:
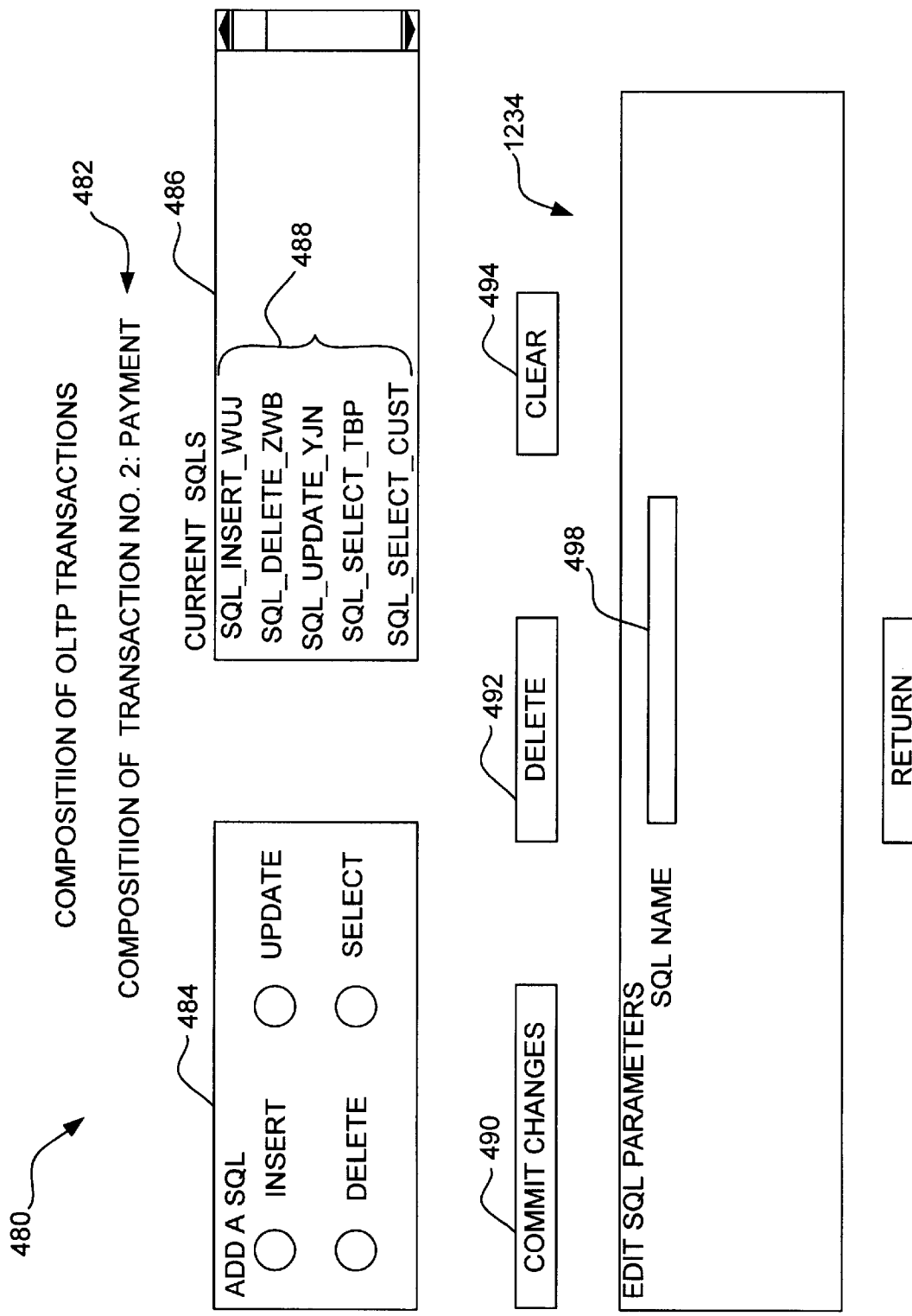
FIG. 11 is an illustration of a computer display screen for defining the SQL composition of a transaction and for defining the parameters used in each SQL statement.

FIG. 11 is an illustration of a computer display screen 480 for defining the SQL composition of a transaction and for defining the parameters used in each SQL statement. Display screen 480 includes a transaction name display portion 482 for displaying the name of the transaction being configured. An SQL selection window 484 allows selection of the SQL statement type to be added using radio buttons including an insert statement, a delete statement, an update statement, and a select statement. An SQL statement list display window 486 allows for display of the SQL statements already defined. An SQL statement list 488 includes the defined SQL statements organized according to their user given names. A screen bottom portion 496 can vary according to the type of SQL statement being configured. An SQL statement name window 498 can be used to enter an SQL statement name, with the function being dependent on the use to which screen bottom portion 496 is being put. A commit changes button 490 can be used to commit the changes made to an SQL statement, a delete button 492 can be used to delete a selected SQL statement, and a clear button 494 can be used to clear the screen of user entered values for an SQL statement.

Figure 12:
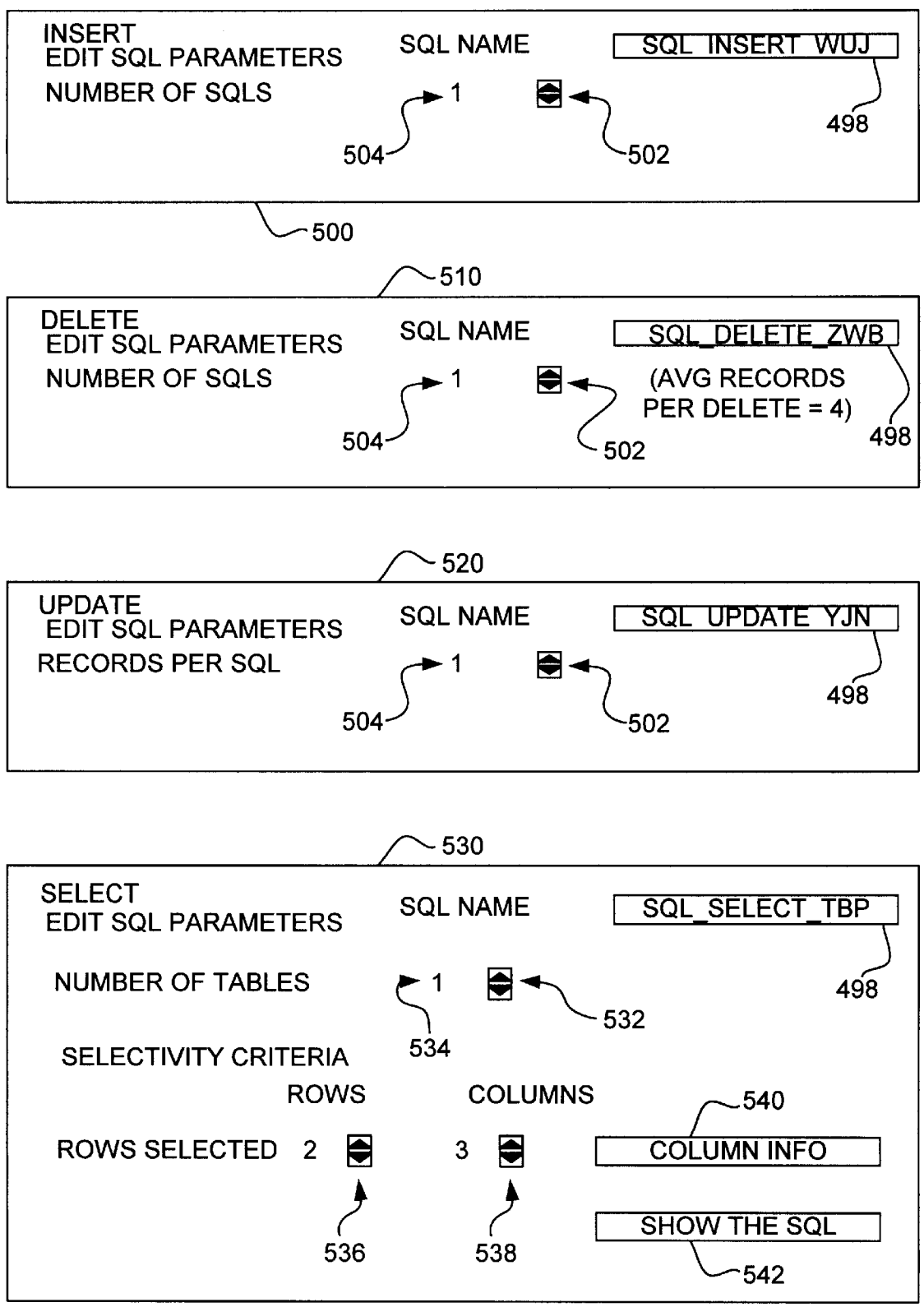
FIG. 12 is an illustration of the bottom portion of the computer display screen of FIG. 11 for defining parameters for inset, delete, update, and select SQL statements.

FIG. 12 is an illustration of the bottom portion 496 of computer display screen 480 of FIG. 11 in various formats for defining parameters for insert, delete, update, and select SQL statements. An SQL insert statement window 500 is illustrated for allowing configuration of an insert statement, including SQL name entry window 498 and number of records spin buttons 502, and allocated display 504 for the number of records operated on by the SQL statement. SQL insert statement window 500 is displayed when an insert SQL statement is newly added on display 480 of FIG. 12 or when an SQL statement of type insert is called up on display screen 480.

An SQL delete statement window 510 has a default number of records per delete of four and can allow entry of the number of records per delete through spin buttons 502. SQL delete statement window 500 is displayed when a delete SQL statement is newly added on display 480 of FIG. 12 or when an SQL statement of type delete is called up on display screen 480.

An SQL update statement window 520 has a number of records per update and can allow entry of the number of records per update through spin buttons 502. SQL update statement window 500 is displayed when an update SQL statement is newly added on display 480 of FIG. 12 or when an SQL statement of type update is called up on display screen 480.

An SQL select statement window 530 has number of tables spin buttons 532 and allocated display 534 for the number of tables operated on by the SQL statement. SQL select statement window 530 is displayed when a select SQL statement is newly added on display 480 of FIG. 12 or when an SQL statement of type select is called up on display screen 480. The selectivity criteria can be adjusted through operation of row selection spin buttons 536 and column selection spin buttons 538. Information on the columns can be obtained by clicking on column information button 540, and the SQL statement can be shown by clicking on button 542. The display windows illustrated in FIGS. 11 and 12 can utilize algorithms and methods as described in co-pending patent application U.S. patent application Ser. No. 09/515,310, filed Feb. 29, 2000, entitled SIZING SERVERS FOR DATABASE MANAGEMENT SYSTEMS VIA USER DEFINED WORKLOADS.

FIG. 13 is an illustration of a computer display screen 550 for displaying the mass storage, workload, communication, and hardware summaries for the DBMS system sized according to the present invention. Display screen 550 can present a summary of most of the important sizing requirement user inputs in a top input portion 551 and most of the important outputs in a bottom output portion 553, where the outputs are generated by the software according to the present invention. Display screen 550 can include a description as to how the workload was defined in a workload definition window 554 and the name and version of the DBMS software in DBMS software window 556. The name of the system or family of servers can be presented in a system window 558 and the processor family and speed displayed in a processor display window 560. The transactions per second workload requirement can be displayed in a transaction per second window 562 and the maximum CPU utilization displayed in a CPU utilization window 564.

Bottom output screen portion 553 includes the number of CPUs required in a CPU requirement window 566, the effective CPU utilization in a CPU utilization window 568, the memory required in a memory requirement window 570, and the mass storage required in a mass storage requirement window 572. The communications LAN speed required to meet the transaction workload can be displayed in a communications requirement window 574, and the expected communications per second can be displayed in a communications rate window 576. The percent communications utilization can be displayed in a communication utilization window 578.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A computer system for operation by a human user for determining a required size for a database management system server comprising:

means for inputting database storage input parameters and transaction input parameters to said computer;

means for displaying results to said user;

first means for determining database mass storage requirements as a function of said database storage input parameters and displaying said mass storage requirements to said user; and second means for determining transaction processing workload requirements as a function of said transaction input parameters for said database management system and displaying said transaction processing workload requirements; and wherein said first means for determining database mass storage requirements utilizes as said database storage input parameters estimates of table row size, table column size, and table fill factor, and generates a table size as a function of said database storage input parameters.

2. A computer system for operation by a human user for determining requirements for a proposed database management system server comprising:

means for inputting database storage input parameters and transaction input parameters to said computer;

means for displaying results to said user;

first means for determining database mass storage requirements as a function of said database storage input parameters and displaying said mass storage requirements to said user; and second means for determining transaction processing workload requirements as a function of said transaction input parameters for said database management system and displaying said transaction processing workload requirements; and wherein said first means for determining database mass storage requirements utilizes as said database storage input parameters estimates of table row size, table column size, and table fill factor, and generates a table size as a function of said database storage input parameters.

3. A method for assisting a human user in determining needed requirements of a proposed database server comprising:

selecting a database management system from among at least two presented choices;

specifying at least one database input parameter;

calculating a required database storage size as a function of said at least one database input parameter;

specifying a transaction workload; and identifying a database server having said required database storage size, having sufficient capacity to handle said transaction workload, and being able to run said database management system; and wherein said required transaction workload is specified at least in part by specifying a composition for a plurality of transactions.

4. A method according to claim 3, wherein said transaction composition includes specifying a plurality of SQL statements for each of said transactions.

5. A computerized method for selecting a database server as recited in claim 4, wherein said SQL statements each have at least one SQL parameter specified to determine a workload requirement for each SQL statement.

6. A method for assisting a human user in determining needed requirements of a proposed database server comprising:

selecting a database management system from among at least two presented choices;

specifying at least one database input parameter;

calculating a required database storage size as a function of said at least one database input parameter;

specifying a transaction workload; and identifying a database server having said required database storage size, having sufficient capacity to handle said transaction workload, and being able to run said database management system; and wherein said required transaction workload is specified at least in part by a required transaction per minute value.

7. A method for assisting a human user in determining needed requirements of a database server comprising:

selecting a database management system from among at least two presented choices;

specifying at least one database input parameter;

calculating a required database storage size as a function of said at least one database input parameter;

specifying a transaction workload; and identifying a database server having said required database storage size, having sufficient capacity to handle said transaction workload, and being able to run said database management system; and wherein said required transaction workload is specified at least in part by a required transaction per unit time value.

8. A method for assisting a human user in determining needed requirements of a proposed database server comprising:

selecting a database management system from among at least two presented choices;

specifying at least one database input parameter;

calculating a required database storage size as a function of said at least one database input parameter;

specifying a transaction workload; and identifying a database server having said required database storage size, having sufficient capacity to handle said transaction workload, and being able to run said database management system; and wherein said database input parameters include a database management system block size, an amount of page padding, statistical summarization estimates of indexes per table and fields per index.

9. A method for assisting a human user in determining needed requirements of a proposed database server comprising:

selecting a database management system from among at least two presented choices;

specifying at least one database input parameter;

calculating a required database storage size as a function of said at least one database input parameter;

specifying a transaction workload; and identifying a database server having said required database storage size, having sufficient capacity to handle said transaction workload, and being able to run said database management system; and wherein said database input parameters include estimates for a number of tables, a total amount of data, an average number of columns per row, an average row size, a percent variable length columns, and an average size of variable length columns per table.

10. A method for assisting a human user in determining needed requirements of a proposed database server comprising:

selecting a database management system from among at least two presented choices;

specifying at least one database input parameter;

calculating a required database storage size as a function of said at least one database input parameter;

specifying a transaction workload; and identifying a database server having said required database storage size, having sufficient capacity to handle said transaction workload, and being able to run said database management system; and wherein said database input parameters include estimates including a page size, a fill factor, an average number of non-clustered indexes per table, an average number of fixed length fields per non clustered index, an average number of clustered indexes per table, and a number of variable length fields per cluster index.

11. A method for assisting a human user in selecting a database server comprising the steps of:

selecting a database management system from among at least two presented choices;

specifying at least one database input parameters;

calculating a required database storage size as a function of said database input parameters;

specifying a transaction workload; and identifying a database server having said required database storage size, having sufficient capacity to handle said transaction workload, and being able to run said database management system; and wherein said database input parameters include estimates including a page size, a fill factor, an average number of non-clustered indexes per table, an average number of fixed length fields per non-clustered index, an average number of clustered indexes per table, and a number of variable length fields per cluster index.

12. A method according to claim 11, wherein said required transaction workload is specified at least in part by a required transaction per minute value.

13. A method according to claim 11, wherein said required transaction workload is specified at least in part by specifying a composition for a plurality of transactions.

14. A method according to claim 13, wherein said transaction composition includes specifying a plurality of SQL statements for each of said transactions.

15. A computerized method for selecting a database server as recited in claim 14, wherein said SQL statements each have at least one SQL parameter specified to determine a workload requirement for each SQL statement.

* * * * *